(12) United States Patent  
Takagi et al.

(10) Patent No.: US 8,029,654 B2
(45) Date of Patent: Oct. 4, 2011

(54) COMPLEX MATERIAL

(75) Inventors: Susumu Takagi, Fukui (JP); Masakazu Nomura, Fukui (JP); Eiichi Shoji, Fukui (JP); Kazuyuki Murase, Fukui (JP)

(73) Assignee: Seiren Co., Ltd., Fukui (JP)

( * ) Notice: Subject to any disclaimer, the term of this patent is extended or adjusted under 35 U.S.C. 154(b) by 0 days.

(21) Appl. No.: 11/715,970

(22) Filed: Mar. 9, 2007

(65) Prior Publication Data

US 2007/0209915 A1   Sep. 13, 2007

(30) Foreign Application Priority Data

Mar. 9, 2006 (JP) .................. 2006-063548

(51) Int. Cl.
*C25B 13/00* (2006.01)
*C25C 7/04* (2006.01)
*G01N 27/26* (2006.01)
*B32B 15/14* (2006.01)
*D04H 1/00* (2006.01)

(52) U.S. Cl. ........ 204/282; 204/283; 204/416; 204/418; 204/421; 442/376; 442/377

(58) Field of Classification Search .................. 442/110; 204/282; 428/212, 372, 373, 389, 394, 395; 264/104, 171, 210.8, 290.5

See application file for complete search history.

(56) References Cited

U.S. PATENT DOCUMENTS

| 3,346,789 | A | * | 10/1967 | Robinson ...................... 361/304 |
| 4,715,235 | A | * | 12/1987 | Fukui et al. ................. 73/862.68 |
| 4,826,554 | A | * | 5/1989 | McIntyre et al. ............. 156/280 |
| 5,268,082 | A | * | 12/1993 | Oguro et al. .................. 204/282 |
| 5,672,438 | A | * | 9/1997 | Banerjee et al. ................. 429/33 |
| 6,787,488 | B2 | * | 9/2004 | Takagi et al. ................. 442/110 |

* cited by examiner

*Primary Examiner* — D. Lawrence Tarazano
*Assistant Examiner* — Altrev Sykes
(74) *Attorney, Agent, or Firm* — Wenderoth, Lind & Ponack, L.L.P.

(57) ABSTRACT

An object of the present invention is to provide a complex material in which an ion conduction film is curved and deformed when a potential difference is applied, which is operated at small electric power, has a large deformation amount, quick response performances, large degree of freedom in shape, and is easy in control of deformation, while having strength and durability necessary for practical use and being excellent in an economical aspect. A conductive cloth (preferably having stretchability), which is made conductive through plating of metal on a cloth or metal complex implantation, is joined as an electrode to both surfaces of the ion conduction film (the film in which an ion exchange film or ion liquid is immersed) made of a fluororesin and the like. When the potential difference is applied, the ion conduction film is deformed.

13 Claims, 3 Drawing Sheets

COMPLEX MATERIAL

BACKGROUND OF THE INVENTION

1. Field of the Invention

The present invention relates to a complex material formed by joining electrodes to both surfaces of an ion conduction film, and more particularly, to a complex material capable of causing curve and deformation thereof by using a potential difference. More specifically, the present invention relates to a complex material formed by joining conductive cloths as electrodes to both surfaces of an ion conduction film. The complex material of the present invention is superior in deformation force and quick response property, has a large degree of freedom for a shape, and has a high strength and durability necessary for practical use. In addition, the complex material of the present invention is excellent in an economic aspect.

2. Description of the Related Art

A technology of generating curve and deformation on an ion conduction film which involves providing electrodes on both surfaces of the ion conduction film and applying potential difference to the electrodes is already proposed. A complex material having the electrodes provided on both surfaces of the ion conduction film has a simple structure, so the miniaturization thereof can easily be made. Further, the complex material operates with small electric power, so the complex material can be used as an actuator element.

For example, JP 07-4075 B proposes a method in which films formed on both surfaces of the ion exchange film coated with noble metal by plating and the like are used as electrodes, and a weak voltage of several volts is applied to the electrodes to move electrolyte in the film, to thereby deform the film on the basis of a swelling difference between front and rear surfaces. Also, EAMEX Corporation proposes a complex material, in which gold as an electrode is chemically plated on an ion exchange resin, as an actuator element (refer to JP 2004-197215 A and JP 2005-187926 A).

However, in the conventional technology of forming the electrode metal films on both surfaces of the ion conduction film by using plating and the like, the metal films that are short of softness and flexibility are formed on both surfaces of the ion conduction film. Thus, there has been a drawback in that because the curve and deformation of the ion conduction film are liable to be suppressed, a sufficient deformation force and quick response property are difficult to obtain.

In other words, the complex material of the ion conduction film and the electrode metal film is thick. Thus, when a curve is to be generated on the complex material, a difference in length is generated between inner and outer surfaces of the curve. In short, the coated film on the inner surface is required to be contracted, or the coated film on the outer surface is required to be expanded. However, although the ion conduction film has stretchability, softness, and flexibility necessary for the deformation in a wet state, the metal film is poor in stretchability and the flexibility. Thus, when the complex material is deformed, there has been a case where the metal film acted as a resistance and weakened the deformation force, to delay a deformation speed.

In particular, as the metal film thickness of the electrode and the ion conduction film thickness increase, this tendency becomes prominent. Thus, it has been difficult to increase the deformation force by making the ion conduction film thick. As a result, there have been such problems that large deformation cannot be followed, the deformation force is weak, a reaction is slow, and the like.

Also, there have been problems with regard to practicability and durability. The conventional technology uses characteristics in which the ion conduction film is curved when a potential difference is applied to the electrode metal films provided on both surfaces of the ion conduction film, the ion conduction film returns to its original state when the application of a voltage is released, and the ion conduction film is curved in an opposite direction when an opposite potential is applied. By properly selecting and repeating those changes in states in accordance with an object, the object can be consequently attained.

However, the conventional technique has such a tendency that a metal thin film short of bending durability is fractured by the repetition of large deformation and bending. The metal film provided as the electrode is required to be formed as thin as possible so as not to suppress the curve and deformation of the ion conduction film. Thus, this tendency becomes more and more prominent.

Also, when the ion conduction film is made thick in order to increase the deformation force, a dimensional difference between the inner and outer surfaces becomes great when being curved. Thus, a force applied to the metal film as the electrode becomes stronger, and the curve and the deformation become more and more difficult to be generated, leading to the metal film being easily fractured. When the metal film of the electrode is made thicker in order to prevent the fracture, the curve and the deformation become difficult to be generated, which results in that the object cannot be attained.

Moreover, in a configuration in which the metal thin films as the electrodes are provided on both surfaces of the ion conduction film, it has been difficult to obtain the characteristics as the complex material necessary for practical use, such as tensile strength and abrasion strength sufficient for practical use. In short, it has been impossible to obtain performances sufficient for enduring stress applied to the complex material in practical use, such as tension, bending, shearing, and abrasion. In other words, for example, many metal films used for the conventional electrodes are poor in stretchability, and when the complex material is expanded by about 10%, the metal film is fractured to be useless as the electrode. In particular, this tendency is severe in the electrode metal film obtained by plating.

As described above, in the conventionally-proposed technique, materials and thicknesses and the like of the electrode and the ion conduction film are required to be limited in order to obtain a sufficient curve and deformation when a voltage is applied. Thus, it has been impossible to obtain a sufficient improvement of durability against stresses such as tension, bending, shearing, and abrasion.

Also, in order to obtain an intended curve and deformation, there has been a limit on a shape of the complex material. In a case of applying the potential difference to both surfaces of the ion conduction film and moving the electrolyte in the film to generate the swelling difference between both surfaces of the film, to thereby generate the curve, for example, when a deformation as shown in FIG. 2 is to be made, the complex material is required to be a rectangle, preferably a rectangle in which a difference between a long side and a short side is large. If a voltage is applied to both surfaces of a square, the deformation caused by the swelling is generated at four corners of the square, and the deformation shown in FIG. 2 cannot be expected. Also, the curve in the case of the rectangle is generated in the long side direction and is never generated in the short side direction. In this way, in the conventional technique, the shape of the complex material is limited, resulting in limiting usage and application. Thus, it has been difficult to devise such a method of increasing the width to increase the curving force.

Also, formation of the electrodes on both surfaces of the ion conduction film by plating and the like requires a number of steps and time. Thus, an improvement in terms of cost has also been an object to be achieved.

SUMMARY OF THE INVENTION

To solve the above-mentioned problems, it is an object of the present invention to provide a method of curving and deforming a conduction film by applying a potential difference, and a complex material which is suitable for the method, which is operated at small electric power, and has a large deformation amount, quick response performances, a large degree of freedom in shape, and is easy in deformation control, while having a strength and durability necessary for practical use and being excellent in an economical aspect.

The inventors of the present invention have found, as a result of intensive studies to attain the above-mentioned object, that the above-mentioned problems can be solved by laminating conductive cloths on both surfaces of an ion conduction film as electrodes instead of forming metal films by plating and the like, and have completed the present invention.

That is, the present invention provides a complex material described in the following items (1) to (8):

(1) A complex material comprising an ion conduction film and electrodes joined to both surfaces of the ion conduction film, wherein said ion conduction film is caused to generate a deformation by applying a potential difference between said electrodes, and each of said electrodes is formed of a conductive cloth.

(2) The complex material according to the above-mentioned item (1), in which said ion conduction film is an ion exchange film or a film immersed with ion liquid.

(3) The complex material according to the above-mentioned item (2), in which said ion exchange film or said film immersed with the ion liquid is formed of a fluororesin-based polymer.

(4) The complex material according to any one of the above-mentioned items (1) to (3), in which said conductive cloth is a composite of cloth and metal obtained by plating or a metal complex implantation.

(5) The complex material according to any one of the above-mentioned items (1) to (4), in which at least one of said electrodes joined to the surfaces of the ion conduction film is formed of the conductive cloth having stretchability.

(6) The complex material according to any one of the above-mentioned items (1) to (5), in which said conductive cloth has a difference in stretchability between orthogonal two axes.

(7) The complex material according to the above-mentioned item (6), in which said difference in stretchability is 2% or more.

(8) The complex material according to any one of the above-mentioned items (5) to (7), in which said conductive cloth is joined to the ion conduction film so that, when the potential difference is applied between the electrodes, the conductive cloth has stretchability in a direction in which the ion conduction film is deformed.

In the complex material of the present invention, the conductive cloth excellent in softness, stretchability, and flexibility as compared with the metal film formed by plating and the like is used as the electrodes joined to both surfaces of the ion conduction film. Thus, when the potential difference is applied, the deformation amount is large, the response is quick, and the degree of freedom in shape is great. Moreover, the control of deformation is easy. The complex material has strength and durability necessary for practical use and is also excellent in an economical aspect.

Figure 1:
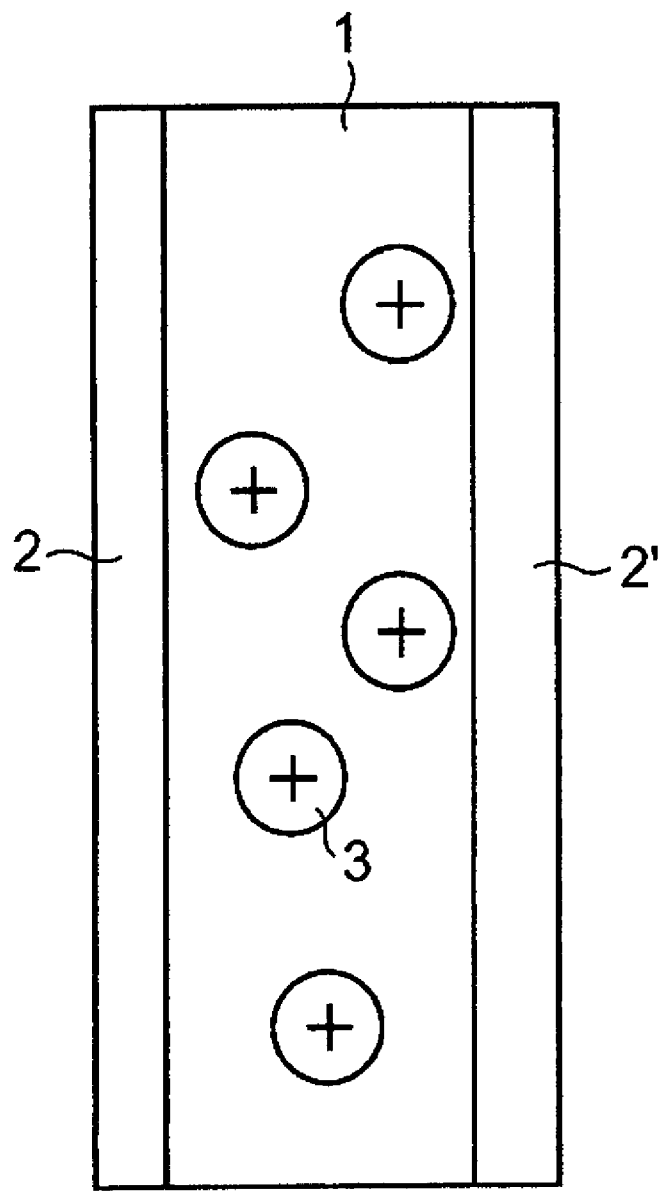
FIG. 1 is a side sectional view of a state where a potential difference is not applied, in an embodiment of a complex material of the present invention.

Description of reference numerals in the figures are as follows:

1 ion conduction film
2, 2' conductive cloth
3 cation
4 cover or supporter

DETAILED DESCRIPTION OF THE PREFERRED EMBODIMENTS

A complex material of the present invention will be described below in detail with reference to the drawings. The complex material of the present invention is provided with: an ion conduction film and electrodes joined to both surfaces of the ion conduction film, and this is designed such that the application of a potential difference between the electrodes causes the ion conduction film to generate a deformation. FIG. 1 is a view showing an example of the complex material of the present invention. As shown in FIG. 1, the complex material of the present invention is provided with: an ion conduction film 1; and electrodes 2, 2' in contact with both surfaces of this ion conduction film 1.

Ion Conduction Film

In the present invention, a function necessary for the ion conduction film is such that there is an ionic substance which can be moved by application of a voltage and such that a swelling degree is changed according to the movement of the ionic substance.

Thus, any film made of the material having the function can be used without particular limitation. Specifically, as the ion conduction film having the function, a cation exchange film, an anion exchange film, and a film in which an ion liquid is immersed, and the like can be listed.

Any cation exchange film can be used without particular limitation. For example, it is possible to use a film of resins obtained by introducing an ionic functional groups such as a sulfonic group, a carboxylic acid group, a phosphoric acid group, or the like into a known resin such as polyethylene, polystyrene, polyimide, and poly-arylenes (an aromatic polymer); or a perfluoro-carboxylic acid resin, a perfluoro-sulfone acid resin, a perfluoro-phosphoric acid resin, or the like obtained by introducing the above-mentioned anionic functional groups into the frame of a fluorine resin-based polymer such as tetrafluoroethylene, polyvinylidenefluoride, or the like. These cation exchange films may be commercially available. For example, it is possible to use a film of perfluorosulfonic acid/PTFE copolymer (tradename: "NAFION™", manufactured by Du Pont Kabushiki Kaisha) and the like.

Any anion ion exchange film can be used without particular limitation. For example, it is possible to use a film of resins obtained by introducing cationic functional groups such as ammonium, sulfonium, phosphonium, oxonium or the like into a known resin such as polyethylene, polystyrene, polyimide and poly-arylenes (an aromatic polymer) or the like, or a film obtained of resins by introducing the above-mentioned cationic functional groups into the frame of a fluorine resin-based polymer such as tetrafluoroethylene, polyvinylidenefluoride or the like.

Also, any film in which the ion liquid is immersed can be used without particular limitation. For example, it is possible to use a film formed in a sheet, after the ion liquid is immersed in a polymer similar to the one used for the above-mentioned ion exchange film such as polyethylene, polystyrene, polyimide, or poly-arylenes, or tetrafluoroethylene, polyvinylidenefluoride, or the like (before the introduction of functional groups).

Any ion liquid can be used without particular limitation. For example, it is possible to use a salt of organic compounds that is liquid at a room temperature, specifically, a salt of known compounds such as imidazolium salt derivatives, pyridinium salt derivatives, phosphonium salt derivatives, tetraalkyl ammonium salt derivatives, or the like.

Examples of the imidazolium salt derivatives include, but not particularly limited to, 1-ethyl-3-methyl-imidazolium trifluoro-methane-sulfonate, 1-ethyl-3-methylimidazolium tetrafluoroborate, 1-ethyl-3-methylimidazolium iodide, 1-ethyl-3-methylimidazolium hexafluoro-phosphate, 1-ethyl-3-methylimidazolium chloride, 1-ethyl-3-methylimidazolium bromide, 1-n-butyl-3-methylimidazolium trifluoro-methane-sulfonate, 1-n-butyl-3-methylimidazolium tetrafluoroborate, 1-n-butyl-3-methylimidazolium hexafluoro-phosphate, 1-n-butyl-3-methylimidazolium chloride, and 1-n-butyl-3-methylimidazolium bromide.

The thickness of the ion conduction film is not particularly limited, but is preferably between about 5 to 5,000 μm. When the film thickness is small (thin), the film is easy to deform. However, the power of the deformation (the deforming force) resulting from the application of a constant voltage becomes small. On the other hand, in the case where the film thickness is large (thick), although the deformation itself becomes hard, the power resulting from the application of the constant voltage becomes large. The film thickness and the required power are different depending on the purpose, and therefore may be selected in accordance with the purpose properly.

(2) Conductive Cloth

The complex material of the present invention is characterized in that a conductive cloth is used as the electrode. In other words, the conductive cloth where a fiber cloth is metallized is used for the electrodes 2, 2' joined to both surfaces of the above-mentioned ion conduction film.

The fiber cloth may be any of textiles, knitted cloths, and non-woven fabrics, and may be properly selected therefrom in accordance with the shape and purpose of the complex material. No particular limitation is imposed on the material quality of the fiber constituting the cloth. It is preferable to use a synthetic fiber excellent in strength and durability such as a polyester fiber, a polyamide fiber, a polyacryl fiber, a polyolefin, or the like.

The conductive cloth is a complex of a cloth and metal, and is manufactured by a method of making the fiber cloth conductive by plating or a method of using supercritical carbon dioxide fluid to implant a metal or metal complex into a fiber. However, the former is advantageous from the viewpoint of a cost. In addition, the conductive cloth may be a cloth manufactured by using a method of weaving or knitting the fiber to which a conductivity is preliminarily given by plating and the like, or may be a non-woven fabric obtained from a fibered material to which the conductivity is given by a common method. The manufacturing method of the conductive cloth used in the present invention is not limited thereto. As long as the cloth having the conductivity can be obtained, any method may be used.

According to the method of making the cloth conductive by plating, the metal-coated film layer is formed on the fiber surface, and the cloth can be uniformly metallized. As a specific method thereof, the conventionally known electroless plating method and electroplating method are preferred. A plating bath is composed of a metallic salt, a reducing agent, a buffering agent, a pH adjuster, and the like.

As the metal used to make the fiber cloth conductive, any metal having the conductivity can be used. From the viewpoint of the endurance, noble metal such as gold, platinum, iridium, palladium, ruthenium, or the like is more preferable. From the viewpoint of a cost, copper, nickel, tin, silver, or the like is more preferable.

The thickness of the formed metal-coated film layer is not particularly limited, and is preferably in a range between 0.1 and 10 μm. If the metal-coated film is less than 0.1 μm, the sufficient surface conductivity may not be obtained, and if thicker than 10 μm, softness of the cloth may be deteriorated. The metal-coated film is not necessarily a single layer formed of a single species. For example, after plating metal on the cloth, an additional different metal may be laminated to provide a multilayer structure by the electroplating method, the electroless plating method, or the like.

Examples of metal complexes used in the method of implanting a metal complex for making the cloth conductive, include bis(acetylacetonato)palladium(II), bis(acetylacetonato)nickel(II), bis(acetylacetonato)copper(II), bis(n-cyclopentadienyl)nickel(II), dichloro(1,5-cyclooctadienyl)palladium(II), (1,5-cyclooctadienyl) dimethylplatinum(II), bis(benzonitrile)dichloropalladium(II), bis(hexafluoroacetylacetonato)palladium(II), bis(hexafluoroacetylacetonato)nickel(II), and bis(hexafluoroacetylacetonato)copper(II).

No particular limitation is imposed on a specific conductivity of the conductive cloth used in the present invention. As the conductive cloth having preferable specific conductivity, the one whose surface resistance value is 1.0Ω/☐ or less can be used.

In order to allow curvature of the complex material whose main element is the ion conduction film, the electrodes joined to both surfaces of the ion conduction film is required to be expanded and contracted so as to cancel the difference between the inner and outer dimensions of the curved complex material. For this reason, the electrodes formed of the conductive cloths having stretchability are preferred to be joined.

It is sufficient that the conductive cloth having high stretchability is joined or adhered to at least one surface of the film. That is, the conductive cloth may be joined to only one surface of the film or may be joined both surfaces of the film. Directions in which stretchability is exhibited are not particularly limited. The cloth that stretches in all directions uniformly is allowable, or the cloth exhibiting high stretchability in a specific direction is also allowable. As a concrete standard of stretchability, an average degree of stretchability is preferably 2% or more and more preferably 5% or more, but is not limited thereto. Note that the average degree of stretchability in this case is the maximum degree of stretchability under the condition that the deterioration in conductivity is maintained at 10% or less.

In the case of using the conductive cloth exhibiting high stretchability in a specific direction, the conductive cloth may be joined such that the cloth exhibits high stretchability in the deformation direction of the ion conduction film or the desired deformation direction when the potential difference is applied. In other words, the joining direction of the conductive cloth is preferred to be adjusted such that it can be expanded and contracted following the deformation of the complex material, in consideration of stretchability of the conductive cloth.

Moreover, the conductive cloth preferably has the difference in stretchability between orthogonal two axes. More preferably, the difference in stretchability is 2% or more, and most preferably 5% or more. By using the conductive cloth having high stretchability, it is possible to obtain the complex material that can effect desired deformation with ease in spite of the shape of the complex material.

Note that the orthogonal two axes in this case are arbitrarily set so that the difference in stretchability becomes maximal on the surface of the conductive cloth. Thus, the difference in stretchability in this case implies the difference in stretchability between the orthogonal two axes thus selected and also implies the maximum value of the difference in stretchability between any orthogonal 2 axes on the cloth.

By using the conductive cloth having high stretchability in a specific direction as mentioned above, it is possible to solve such a problem that the conventional technique could execute only the deformation in the long side direction of the complex material and could not control the deformation in the short side direction and the deformation of the square material, which makes it possible to control the deformation irrespective of the shape.

No particular limitation is imposed on the thickness of the conductive cloth. The thickness can be properly selected on the basis of the purpose or the properties required for the complex material, and may preferably be set between 5 and 5,000 μm. If the thickness is within this range, a good balance is maintained between the deforming force and the ease of deformability.

In the present invention, by using the conductive cloth that is more excellent in softness, stretchability and flexibility than a metal thin film as an electrode, the curve and deformation of the ion conduction film are not disturbed. The cloth used as the conductive cloth is properly selected depending on its purpose, object, and the like. For example, when importance is attached to stretchability of the electrode because the displacement amount is large, a circular knitting fabric having high stretchability is proper, and when the tensile strength is required, a textile is proper. In any case, by using the conductive cloth that is superior in softness, stretchability, flexibility and abrasion resistance as an electrode, the property endurable against practical use can be given to the intended complex material.

Also, in the present invention, the conductive cloth that is industrially manufactured in advance by using known methods can be used, which is advantageous in a cost as compared with the conventional method of plating metal on the conduction film.

(3) Complex Material

The complex material of the present invention needs to be in a hydrous state when the ion conduction film is an ion exchange film, in order to apply the potential difference between the electrodes to cause curve and deform them. Here, the hydrous state implies that this complex material is operated in water or even in atmosphere at a high humidity. Although there is a case that, in water, ions included in the peripheral water have influence on the operation, it can be operated even in the liquid including various solutes.

Figure 2:
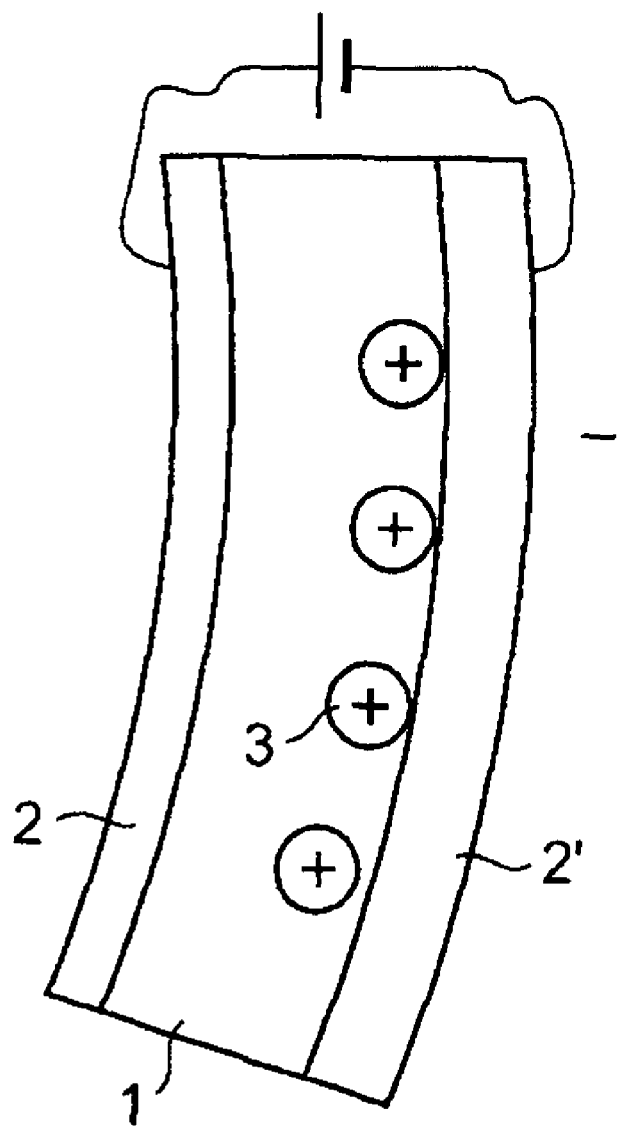
FIG. 2 is a side sectional view of a state where the potential difference is applied, in the embodiment of the complex material of the present invention.

When the electrodes 2, 2' are connected through lead lines to arbitrary waveform generation power source (direct current power source or alternating current power source), the complex material of FIG. 1 is curved as shown in FIG. 2. This operation mechanism or principle is not clear. However, when the ion exchange film is used, the potential difference is applied between the front and back of the film. Thus, as shown in FIG. 2, cations 3 in the ion exchange film 1 are moved to the side of a cathode 2', and in association with those ions, water molecules are moved inside the film. Thus, differences in the amount of water and the osmotic pressure are supposed to be generated between the anode side and the cathode side. Thus, when a hydrous rate is increased, it is swelled, and when the hydrous rate is decreased, it is contracted. Hence, when a difference in the amount of water or ion concentration is generated between the front and rear of the film, the film is considered to be curved.

However, even if there is a difference in the ion distribution, when the shift of ions is stopped in that state, water distribution is supposed to be gradually close to the original uniform state by diffusion of water from outside the film. In other words, even if the constant voltage is applied, when current in the film is decreased, the distribution of once-generated hydrous rate is gradually averaged. Thus, the curve is considered to return to the original state. In this way, the state of the curve can be controlled in accordance with the value of the voltage, and it can be repeatedly curved.

When the cation exchange film is used in pure water, the moving ions are considered to be $H^+$ ions, and when it is used in saline solution, they are considered to be $Na^+$ ions. Thus, when the voltage is applied, those ions are moved together with the water molecules to the cathode side. With such consideration, the hydrous rate of the film on the cathode side is increased, and the hydrous rate on the anode side is decreased. Hence, since the cathode side is expanded and the anode side is contracted, the film is curved to the anode side.

No particular limitation is imposed on ions in the ion conduction film. In the case of the cation film, instead of proton, it is possible to use different ions, for example, alkali metal ions such as a lithium ion, a sodium ion, a potassium ion, or the like, alkaline earth metal ions such as a beryllium ion, a magnesium ion, a calcium ion, or the like, or organic-based or inorganic-based cations such as an ammonium ion, a pyridinium ion, a sulfonium ion, a phosphonium ion, an oxonium ion, or the like. In the case of the anion film, it is possible to use sulfonic acids, carboxylic acids, phosphoric acids, or the like. When proton of the cation film is exchanged with, for example, a lithium ion, it is possible to obtain a complex material having large curve and bent deformation.

In a case of using the ion conduction film in which an ion liquid is immersed in a polymer film of fluorine-type or aromatic-type polymers, since the potential difference is applied between the front and rear of the film, the ion liquid in the film is moved to the electrode. Thus, the phenomenon similar to the ion exchange film is supposed to be generated. In the case of the ion liquid, the moving substance is not water, but is ion in the ion liquid. Thus, even under a low temperature, the curving motion can be carried out without any influence of temperature such as in the case of water. Also, there is a merit that the ion liquid is difficult to evaporate as compared with water. Hence, even under the environment in which the outside air is dry, the stable bending is possible.

Also, the conventionally-proposed technique had the defect that the shape was principally limited. In short, when the shape of an element is rectangular, the element is curved in the long side direction, and is never curved in the short side direction. Also, when the potential difference is applied in the square shape, deformations are only generated at the 4 corner portions. That is, in the case of the conventional technique, in order to obtain the deformation and curve as shown in FIG. 2, the shape is required to be a rectangle, particularly, wherein the difference between the long side and short side thereof is required to be increased.

However, the present invention can solve even this problem. In the fiber cloth, the extremely various stretching characteristics can be obtained, depending on the differences of cloth structures derived from a string process, weaving process, knitting process, or the like. Not only the fiber cloth having stretchability only in one direction of longitudinal or lateral direction, but also the fiber cloth having stretchability in all directions can be easily produced. By making this fiber cloth conductive by plating, the conductive cloth having the similar stretchability can be easily obtained.

In the present invention, since the conductive cloth is used in the electrode, the directions of curve and deformation can be freely designed. In other words, conventionally, the complex material that is a square or a rectangle curved in the short side direction cannot be manufactured. However, by using the conductive cloth having differences in stretchability between the longitudinal and lateral directions as the electrode, curve and deformation can be generated in the direction of stretching easily. Consequently, by using directivity of stretchability of the electrode without any dependence on the shape of the electrode, the directions of curve and deformation can be designed. This fact implies that there is no limitation on the shape of the complex material. As a result, for example, with curving in the short side direction, the increase in the force can be attained, or it is possible to easily cope with the shape request based on its usage.

(4) Manufacturing Method of Complex Material

Figure 3:
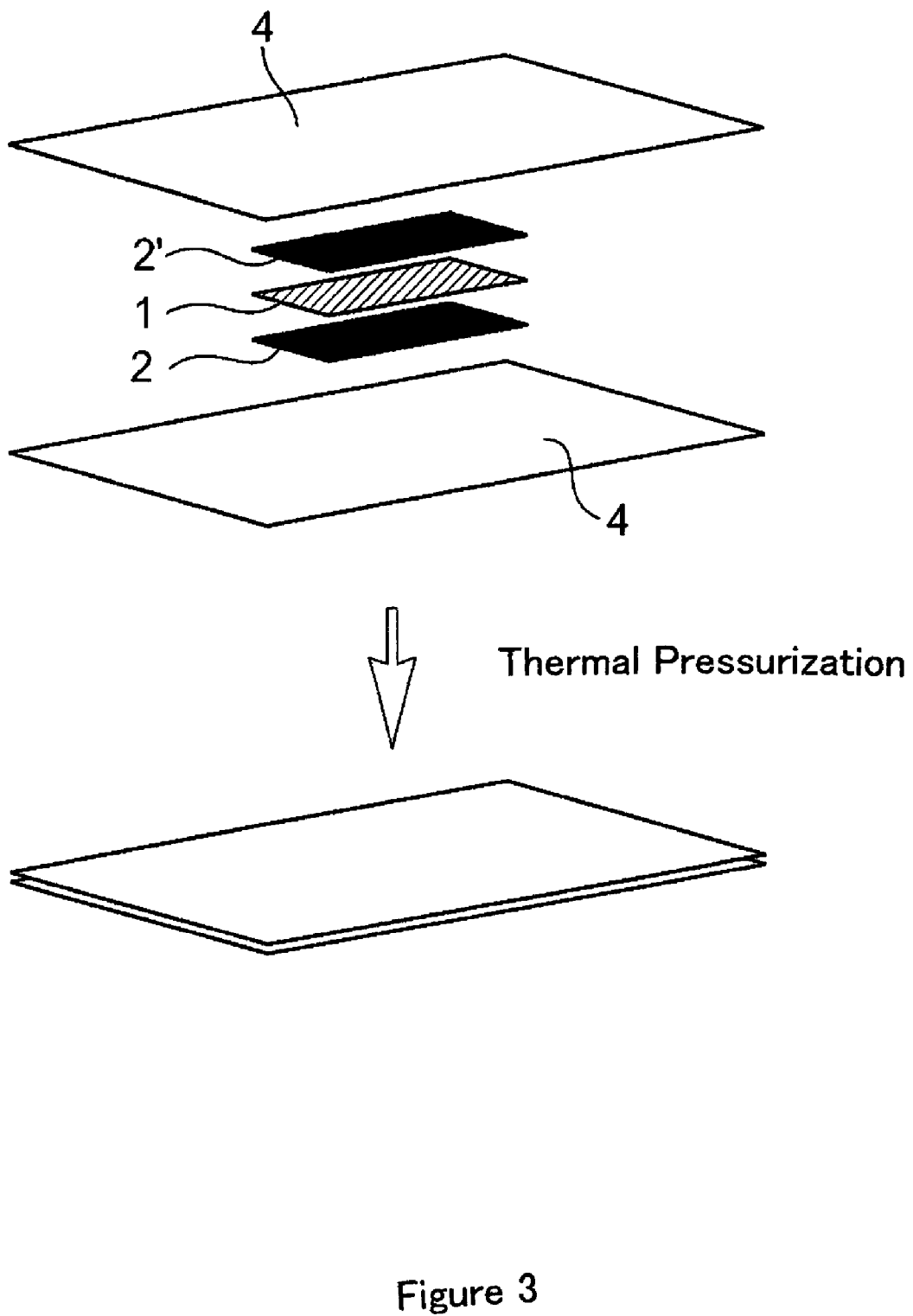
FIG. 3 is a schematic view showing an example of a manufacturing method of a complex material of the present invention.

As shown in FIG. 3, the complex material of the present invention can be manufactured by laminating the ion conduction film 1 and the conductive cloths 2, 2'. The laminating method is not particularly limited, and any methods used in usual lamination film manufacturing methods can be properly employed. Preferably, it can be manufactured such that the ion conduction film is sandwiched between two conductive cloths to form a sandwich where the conductive cloths are in contact with both surfaces of the ion conduction film, and then a pressure (about 0.0001 to 10 tons) is applied to this sandwich from one side or both sides. At this time, a heating press can be carried out by applying the pressure and simultaneously adding the heat (preferably, about 40 to 300° C.) enough to prevent the ion conduction film from melting.

Also, when forming a sandwich, both sides thereof can be covered with polymer films, metal plates or the like, and thermal pressurization or the like can be performed thereon. As a polymer film used as this cover or a supporter (denoted by 4 in FIG. 3), a film of commodity resins such as polyester film such as PET (polyethylene terephthalate) and the like can be used. Also, as the metal plate, an aluminum plate, a copper plate, a stainless plate, or the like can be used. When the metal plate is used, a concave portion for setting the conductive cloth and the ion conduction film is formed on the surface. After the ion conduction film and the conductive cloth are joined, the cover or supporter is removed.

Also, before being brought into contact with the ion conduction film, the conductive cloth is preferred to be immersed in the solution in which the polymer having the high adhesive with the ion conduction film is dissolved. For example, in the case of fluorine-based polymer, the conductive cloth is preferred to be immersed in the solution where a polymer such as "NAFION™" having a fluorine frame is dissolved. Since the immersed polymer serves as a binder, good adhesiveness between the ion conduction film and the conductive cloth can be maintained.

(5) Usage Field of Complex Material

In the complex material of the present invention, by applying a voltage of arbitrary waveform (the direct current voltage or alternating current voltage) in the range of about 0.1 and 10 V between the electrodes, the deformation having high deformation rate can be attained at the excellent quick response and deformation control performances. Also, the degree of freedom in the shape is high, and strength and durability are excellent. Thus, the complex material of the present invention can be applied as the actuator element to the various kinds of usage such as medical equipments, an industrial robot, a micro machine, and the like. For example, this can be used for artificial muscles for a subminiature robot to be operated in water, or can be applied to a power source of a medical device to be used within the living body.

Embodiment

The present invention will be specifically described below by way of embodiments. However, the present invention is not limited to those embodiments. Note that the evaluating methods of respective physical properties in the following embodiments are as follows:

<Processing Cost>

A processing cost was evaluated based on the following standards taking into consideration of the number of steps and the time which were required to form the complex material.

○; Capable of producing within one hour by sticking a conductive cloth to an ion conduction film.

x; The electrodes were formed on both surfaces of the film by plating. It took 20 hours or more to form the coated film of 5 μm.

<Deformation Property>

The direct current voltage of 3 V was applied to an evaluation sample (3×15 mm), and the dislocation in the long side direction was measured. Evaluation was conducted based on the following standards:

○; Dislocation of 5 mm or more

Δ; Dislocation in a range of 2 mm or more to less than 5 mm x; Dislocation of less than 2 mm <Strength (Tensile Strength)>

The evaluation sample of the embodiment was cut to form the complex material of 10 mm×10 mm and the condition of fracture of the electrodes at the time when a load of 1 kg was applied was evaluated and judged based on the following standards by measuring the deterioration of conductivity. Here, the deterioration of conductivity was evaluated based on a change rate (change rate of surface resistance value) by measuring the surface resistance value (conductivity) of the complex material in cases of the presence and absence of a load. The surface resistance value was determined by using a resistance value measurement instrument "Trade Name; Milliohm HiTESTER 3220", manufactured by HIOKI E. E. CORPORATION, to measure the conductivity at a clip balance electrode width of 10 cm and an inter-electrode distance of 10 cm (a clipping method)

○; Conductivity deterioration of less than 10% x; Conductivity deterioration of 10% or more

<Strength (Bending Resistance)>

After a 180-degree bending was repeated 10 times for the evaluation sample (3×15 mm), the condition of fracture of the electrodes was judged based on the following standards by measuring the conductivity:

○; Conductivity deterioration of less than 10% x; Conductivity deterioration of 10% or more

<Surface Resistance Value>

The surface resistance value of the conductive cloth was determined by using the resistance value measurement instrument "Milliohm HiTESTER 3220", manufactured by HIOKI E. E. CORPORATION, to measure the conductivity at the clip balance electrode width of 10 cm and the inter-electrode distance of 10 cm (the clipping method).

<Stretchability>

The conductive cloth was cut to 10 mm×10 mm. Then, while measuring conductivity by using the measuring method of the surface resistance value, a stretch rate was measured by adding a load. Then, the load was gradually increased and a stretch rate when the conductivity reached 10% was determined as the degree of stretchability.

Example 1

As the ion conduction film, a film of perfluoro-sulfonic acid/PTFE copolymer (Trade Name "NAFION™", manufactured by Du Pont Kabushiki Kaisha), which is a proton type, having a thickness of about 200 microns (2 cm×5 cm) was prepared. This NAFION film was heated between 80° C. and 100° C. in 500 mL of a nitric acid aqueous solution of 5M for 30 minutes and sufficiently washed with the ion exchange water. Then, the film was immersed into 500 mL of the ion exchange water and boiled for about 30 minutes. In this way, the NAFION film to be used for the complex material was obtained.

Gold plating was conducted on a polyester textile (taffeta) of about 60 g/m$^2$ by a known method to obtain a conductive cloth having a surface resistance value of 0.1Ω/□ (the thickness: 90 μm, the average degree of stretchability; about 0% for both in longitudinal and lateral directions and 10% in bias directions, the difference in stretchability between the bias directions; about 0%). The conductive cloth (2 cm×5 cm) was sliced into two in the bias directions, and immersed in a lower alcohol solution in which NAFION is dissolved. Then, the previously-washed NAFION film was quickly sandwiched between those two non-woven fabrics.

The obtained sandwich was quickly covered from both sides with two polyester (PET) films of about 6 cm×10 cm, and set in a heating press machine whose temperature was set to 90° C. At the point of start, a pressure of about 0.5 tons was applied. After 30 minutes, it was taken out and was cut to 3 mm×15 mm, and the complex material in which the ion conduction film and the conductive cloth (non-woven fabric) were laminated was obtained. The adhesion between the non-woven fabric and the NAFION film of the obtained complex material (composite film) was confirmed, and it was also confirmed that the film was deformed by the direct current voltage of about 1 to 5 V.

Also, this composite film was immersed in a lithium hydroxide solution of about 0.2 M for about one hour to exchange the inner protons with lithium ions. After rinsing with the ion exchange water and wiping the water on the surface slightly, it was confirmed that the composite film was deformed at the direct current voltage of about 1 to 5V. Also, as a result of the evaluation of tensile strength and bending resistance of the complex material after the exchange with lithium ions, both properties were found to be excellent. Table 1 shows the evaluation results.

Example 2

As the ion conduction film, a film of perfluoro-sulfonic acid/PTFE copolymer (Trade Name "NAFION™", manufactured by Du Pont Kabushiki Kaisha), which is a proton type, having a thickness of about 200 microns (2 cm×5 cm) was prepared. This NAFION film was heated between 80° C. and 100° C. in 500 mL of a nitric acid aqueous solution of 5 M for 30 minutes and was sufficiently washed with the ion exchange water. Then, this was immersed in 500 mL of the ion exchange water and boiled for about 30 minutes. Further, this was immersed in 500 mL of lithium hydroxide solution of about 0.2 M for about one hour. This film exchanged with the lithium ions was sufficiently rinsed and washed with the ion exchange water. This was dehydrated in an oven set at 120° C. for about 10 hours. The thus-obtained film was immersed in 1-ethyl-3-methyl-imidazolium trifluoromethane-sulfonate as an ionic liquid for about 10 hours. In this way, the ion conduction (NAFION) film to be used in the complex material was obtained.

Gold plating was conducted on a polyester textile (taffeta) of about 60 g/m$^2$ by a known method to obtain a conductive cloth of a surface resistance value of 0.1Ω/□ (the thickness: 90 μm, the average degree of stretchability; about 0% in both of longitudinal and lateral directions, and 10% in bias directions, the difference in stretchability between the bias directions; about 0%). The conductive cloth (2 cm×5 cm) was sliced in two in the bias directions, and immersed in a lower alcohol solution in which NAFION has been dissolved. Then, the previously-washed NAFION film was quickly put between those two non-woven fabrics to be a sandwiched therebetween.

The obtained sandwich was quickly covered from both sides with two polyester (PET) films each of approximately 6 cm×10 cm, and set onto a heating press machine whose temperature was set to 90° C. At a start time, a pressure of approximately 0.5 tons was applied. After 30 minutes, the sandwich was taken away, and the complex material in which an ion conduction film and a conductive cloth (non-woven fabric) were laminated was obtained. The adhesion between the non-woven fabric of the obtained complex material and the NAFION film was confirmed, and it was also confirmed that the film was deformed by the direct current voltage between about 1 and 5 V. Also, the evaluations of the tensile strength and the bending resistance of the complex material were conducted. The results were both excellent. Table 1 shows the evaluation result.

Example 3

Copper plating film was formed by using a known method on a polyester textile (taffeta) of about 60 g/m$^2$, and nickel plating was further conducted on the copper film, whereby a conductive cloth of a surface resistance value 0.05Ω/□ (thickness; 90 μm, average degree of stretchability; about 0% both in the longitudinal and lateral directions, and 10% in the bias directions, difference in stretchability between the bias directions; about 0%) was obtained. The complex material was manufactured and evaluated in accordance with Example 1, except for using the thus-obtained copper/nickel plated conductive cloth. It was confirmed that the complex material was deformed by the direct current voltage between about 1 and 5 V. Also, the evaluations of the tensile strength and the bending resistance of the complex material exchanged with lithium ions were conducted. The results were both excellent. Table 1 shows the evaluation result.

Example 4

The complex material was manufactured in accordance with Example 1, except that the film thickness of the ion conduction film was changed from 200 microns to 800 microns and that the conductive cloth was changed from a textile to a circular knitting cloth (gold plating, surface resistance value; 0.1Ω/□, thickness; 90 μm, average degree of stretchability; 10% in all directions, difference in stretchability; 0%). The evaluation results of the deformation by the application of a voltage and the bending resistance were excellent. Table 1 shows the evaluation results.

Example 5

The complex material was manufactured in accordance with Example 1, except that each of the ion conduction film, the conductive cloth, and the complex material had a size of about 5 cm×5 cm and that the conductive cloth whose base cloth was a tricot in which the conductive cloth hardly expanded in one direction of the square and well expanded in another direction orthogonal thereto was used (gold plating, surface resistance value; 0.1Ω/□, thickness; 90 μm, average degree of stretchability; 0% in a longitudinal direction and 5% in a lateral direction, difference in stretchability; 5%). An evaluation sample which was cut to a size of 15×15 mm was evaluated. It was confirmed that the complex material was deformed in the direction excellent in stretchability of the conductive cloth by the application of a voltage between about 1 and 5 V. Also, the complex material exhibited excellent bending resistance. Table 1 shows the evaluation result.

Example 6

As an electrode joined to one side of the ion conduction film, a conductive cloth of circular knitting having 10% or more of stretch rate (average degree of stretchability) in all directions was used. On the other side of the ion conduction film, a conductive cloth of a textile that was hardly stretched was used. Except that, the complex material was manufactured and evaluated in accordance with Example 1. As a result, when a voltage was applied, the complex material exhibited excellent deformation, bending resistance, and strength. Table 1 shows the evaluation result.

Comparative Example 1

The conductive cloth was not used to form an electrode. Instead, a gold-plated film having a thickness of 3 microns was directly formed on the ion conduction film by the electroless plating. It took about 50 hours to form the electrode by plating. Except for the electrode, the complex material was manufactured in accordance with Example 1. The deformation, bending resistance, and tensile strength when a voltage is applied between 1 and 5 V were evaluated. As a result, as compared with Example 1, the complex material hardly deformed, and the tensile strength and the bending resistance were poor. Table 1 shows the evaluation result.

Comparative Example 2

The conductive cloth was not used to form an electrode. Instead, the gold-plated film having a thickness of 3 microns was directly formed on the ion conduction film having a thickness of about 800 microns by the electroless plating. It took about 50 hours to form the electrode by plating. Except for the electrode, the complex material was manufactured in accordance with Example 1, and the deformation, bending resistance property, and tensile strength when a voltage is applied between 1 and 5 V were evaluated. As a result, as compared with Example 3, under the application of the voltage between 1 and 5 V, the complex material hardly deformed, and its tensile strength and bending resistance property were poor. Table 1 shows the evaluation result.

Comparative Example 3

Except for forming an electrode directly on the ion conduction film, the complex material was manufactured and evaluated in accordance with Example 5. As a result, the four corners of the square slightly deformed. Its bending resistance and tensile strength were poor. Table 1 shows the evaluation result.

TABLE 1

| | No | Film | Electrode Cloth | Metal | Dimension mm | Processing cost | Deformation | Strength Tensile Strength | Bending Resistance |
|---|---|---|---|---|---|---|---|---|---|
| Example | 1 | Ion exchange film 200μ | Textile | Au | 3 × 15 | ○ | ○ | ○ | ○ |
| | 2 | Ion Liquid 200μ | Textile | Au | 3 × 15 | ○ | ○ | ○ | ○ |
| | 3 | Ion exchange film 200μ | Textile | Cu—Ni | 3 × 15 | ○ | ○ | ○ | ○ |
| | 4 | Ion exchange film 800μ | Circular Knitting | Au | 3 × 15 | ○ | ○ | ○ | ○ |
| | 5 | Ion exchange film 200μ | Tricot | Au | 15 × 15 | ○ | ○ | ○ | ○ |
| | 6 | Ion exchange film 200μ | Circular Knitting/ Textile | Au | 3 × 15 | ○ | One side ○ One Side x | ○ | ○ |
| Comparative Example | 1 | Ion exchange film 200μ | — | Au | 3 × 15 | x | Δ | x | x |
| | 2 | Ion exchange film 800μ | — | Au | 3 × 15 | x | x | x | x |
| | 3 | Ion exchange film 200μ | — | Au | 15 × 15 | x | x | x | x |

The complex material of the present invention uses a conductive cloth excellent in softness, stretchability, and flexibility, as the electrode to be joined to both surfaces of the ion conduction film. Thus, when applying the potential difference, the deformation amount is large, and quick response performances and deformation control properties are excellent. Also, the degree of freedom in shape is high, and strength and durability necessary for practical use are excellent, and economical performances are high. Thus, the complex material of the present invention can be applied as an actuator element to various kinds of usage, such as medical equipments, an industrial robot, a micro machine, and the like. For example, the complex material can be used for artificial muscles for a subminiature robot to be operated in water, or can be applied to a power source of medical devices to be used within the living body.

What is claimed is:

1. A complex material comprising:
   an ion conduction film; and
   electrodes joined to both surfaces of the ion conduction film, wherein:
   said ion conduction film is caused to generate a deformation by applying a potential difference between said electrodes, and
   each of said electrodes is formed of a conductive cloth having 2% or more average degree of stretchability and having a difference of 2% or more in stretchability between orthogonal two axes, and which is a composite of metal and a cloth wherein said cloth is composed of a synthetic fiber selected from the group consisting of a polyester fiber, a polyamide fiber, a polyacrylic fiber and a polyolefin fiber and is metallized uniformly.

2. The complex material according to claim 1, in which said ion conduction film is an ion exchange film or a film immersed with ion liquid.

3. The complex material according to claim 2, in which said ion exchange film or said film immersed with the ion liquid is formed of a fluororesin-based polymer.

4. The complex material according to claim 1, in which said conductive cloth is a composite of cloth and metal obtained by plating or a metal complex implantation.

5. The complex material according to claim 1, in which at least one of said electrodes joined to the surfaces of the ion conduction film is formed of the conductive cloth having stretchability.

6. The complex material according to claim 5, in which said conductive cloth is joined to the ion conduction film so that, when the potential difference is applied between the electrodes, the conductive cloth has stretchability in a direction in which the ion conduction film is deformed.

7. The complex material according to claim 1, in which said conductive cloth has surface resistance value of $1.0\Omega/\square$ or less.

8. An actuator element comprising the complex material according to claim 1.

9. An actuator element comprising the complex material according to claim 2.

10. An actuator element comprising the complex material according to claim 3.

11. An actuator element comprising the complex material according to claim 4.

12. An actuator element comprising the complex material according to claim 5.

13. An actuator element comprising the complex material according to claim 6.

* * * * *